United States Patent [19]

Saganovsky

[11] Patent Number: 5,571,062
[45] Date of Patent: Nov. 5, 1996

[54] TREADMILL SAFETY MODULE

[75] Inventor: Abraham Saganovsky, Coral Springs, Fla.

[73] Assignee: KB Electronics, Inc., Coral Springs, Fla.

[21] Appl. No.: 537,588

[22] Filed: Nov. 2, 1995

[51] Int. Cl.[6] ........................................................ H02P 5/00
[52] U.S. Cl. ........................ 482/54; 482/4; 361/33; 361/51
[58] Field of Search .................... 318/1, 2, 3, 6, 318/55, 56, 59, 60, 66; 361/51, 33, 91; 388/806; 482/1, 4, 7, 54

[56] References Cited

U.S. PATENT DOCUMENTS

| 3,636,545 | 1/1972 | Boyd et al. | 361/51 X |
| 4,031,439 | 6/1977 | Sakai et al. | 361/51 X |
| 4,791,345 | 12/1988 | Boillat | 318/696 |

Primary Examiner—Richard J. Apley
Assistant Examiner—Glenn E. Richman
Attorney, Agent, or Firm—Frishauf, Holtz, Goodman, Langer & Chick

[57] ABSTRACT

A safety module for a motor speed control circuit, when speed control circuit has a failure mode in which full power is applied to the motor being driven by the speed control circuit. The safety module has a high pass filter coupled to a variable voltage power output of the speed control circuit, and a threshold member coupled to an output of the high pass filter for passing a signal only if a change in the signal exceeds a predetermined value. A semiconductor short-circuiting switching device is coupled to the threshold device and is also coupled to the power terminals of the motor and to the output of the speed control circuit for shorting out the output of the speed control circuit responsive to an abrupt increase in a signal at the output of the speed control circuit which exceeds the predetermined value at the output of the speed control circuit.

1 Claim, 1 Drawing Sheet

TREADMILL SAFETY MODULE

BACKGROUND OF THE INVENTION

This invention relates to a safety module, and more particularly to a safety module which provides fail-safe operation of an exercise treadmill speed control in order to prevent high speed operation of the treadmill drive motor when the speed control thereof fails.

With the advent of new transistor technology, including high power MOSFET's and IGBT's, a new class of low-cost, highly efficient variable speed DC motor controls has been developed. Such variable speed motor controls are commonly used to control the operating speed of the moving tread of an exercise treadmill. The motor controls are pulse width modulated (PWM) DC motor speed controls, which are replacing standard phase-controlled SCR-type speed controls in some treadmill applications.

When a PWM (pulse width modulated) motor speed control is used in an application where an operator is in direct interaction with the machine, such as in an exercise treadmill, if the power transistor in the PWM motor speed control unit fails in a short circuited mode, then instantaneous full output will be applied to the DC motor, thereby abruptly increasing the speed of the treadmill to substantially full speed and possibly causing physical harm to the user and/or damage to the equipment. In the prior art full-wave SCR motor speed controls, if the SCR of the control were to fail, the control output would normally go to zero, and the treadmill would stop, thereby reducing the risk associated with failure of the speed control.

When using a PWM motor speed control for a moving tread of a treadmill, it is advised that an additional safety circuit, such as a special fast-acting fuse, a speed monitoring circuit, or other safety device be used in conjunction with the PWM speed control in order to prevent physical harm to the user and/or damage to the equipment if the power transistor thereof fails in a short circuited mode. However, such prior controls have been found to be insufficient.

OBJECTS OF THE INVENTION

The object of the present invention is to provide a safety module for use with a PWM DC motor speed control which provides fail-safe operation by quickly de-energizing the motor when the power transistor in the PWM speed control unit fails in a short circuited mode.

It is a further object of the present invention to provide such a safety module for use with a treadmill wherein the DC motor is reliably and substantially instantaneously de-energized so as to stop the motor upon failure of the power transistor of the speed control in a short circuited mode, thereby preventing injury to the user and also preventing damage to the equipment.

DETAILED DESCRIPTION

Figure 1:
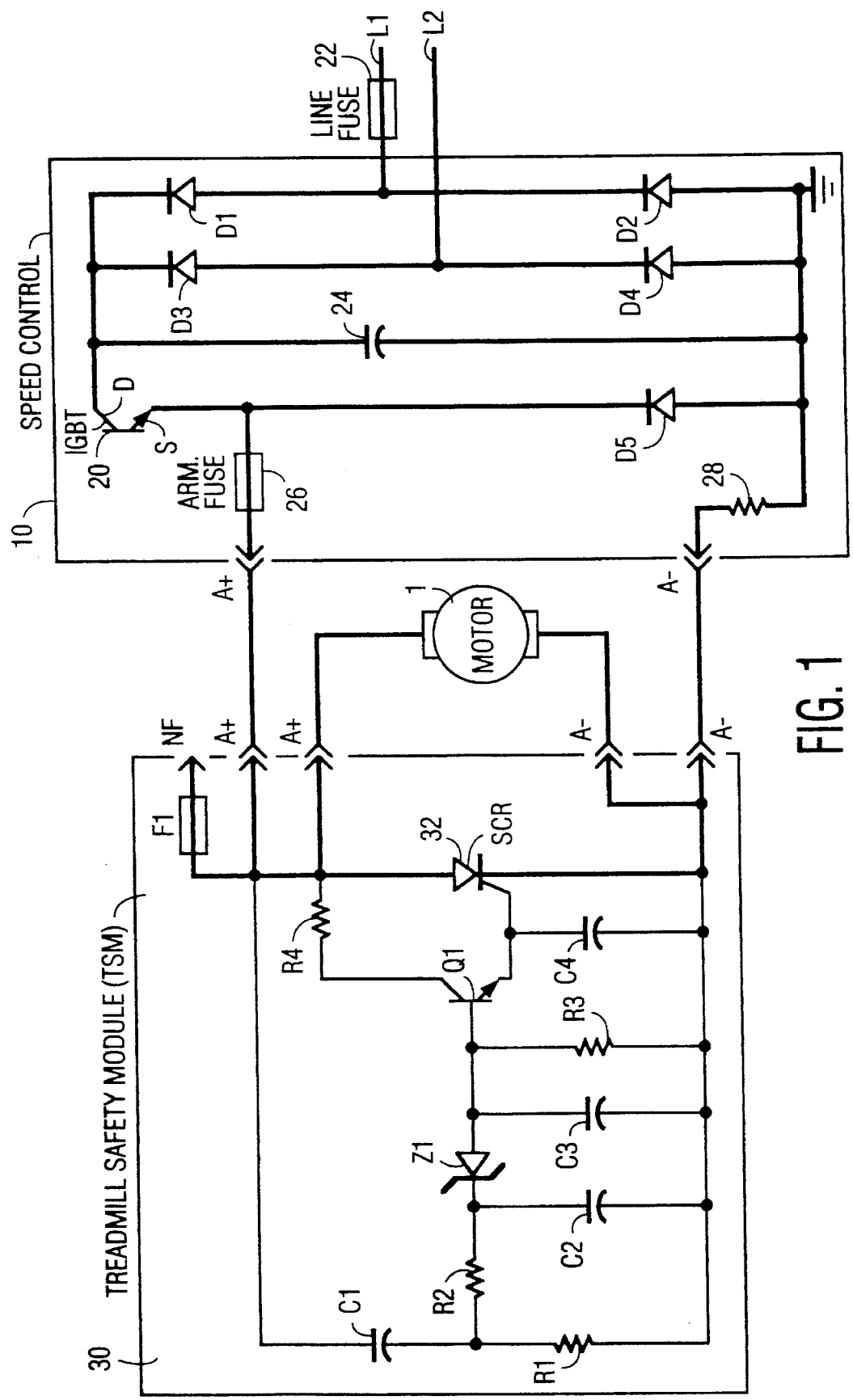
FIG. 1 is a schematic circuit diagram of a typical DC motor speed control of the PWM (pulse width modulated) type, combined with a safety module of the present invention.

Referring to FIG. 1, a conventional DC motor speed control 10 comprises an IGBT transistor 20 connected in a conventional PWM speed control circuit. Power is supplied to the speed control circuit 10 by lines L1 to L2. In products sold in the United States, the power supplied to lines L1, L2 is generally 117 volts, 60 cycles. A line fuse 22 is connected in one of the power lines L1. The power is supplied to a full wave rectifying circuit comprised of diodes D1, D2, D3 and D4, and a capacitor 24 connected across the output of the full wave rectifier circuit. The IGBT transistor 20 and a free wheeling diode D5 is also connected across the output of the full wave rectifier circuit, with the drain D of IGBT 20 connected to an output of the full wave rectifier circuit and the source S thereof connected to diode D5. The output of the speed control circuit is taken from the junction of the source S of the IGBT transistor 20 and the diode D5, and may include a fuse (armature fuse) 26 in the output line to the motor 1. A current sensing resistor 28 is connected in series with the other output line, the other end of resistor 28 being coupled to ground potential.

In a conventional system, the outputs A+ and A− of the speed control circuit 10 are connected to the DC motor 1 of the device (the prior art connection is not shown), such as a treadmill drive motor. If the IGBT transistor 20 fails, usually in a short circuited mode, the output A+, A− has full power applied thereto and the treadmill drive motor 1 is therefore operated at full speed. This could cause harm to a user of a treadmill and/or could cause damage to the equipment.

According to the present invention, the safety module 30 is connected to the A+, A− outputs of the conventional PWM speed control 10. The safety module 30 of the present invention comprises an SCR 32 connected across the input terminals A+, A− of the safety module. The SCR 32 is controlled by means of a high pass filter network comprising capacitor C1 and resistor R1 which are connected in series across the input A+, A− of the safety module. A second filter comprising resistor R2 and capacitors C2 and C3 is provided to filter out a 20 KHz switching frequency. Zener diode Z1 provides a threshold to prevent erroneous firing (turning on) of the SCR 32 due to small fluctuations of the armature voltage of the motor 1. If the armature voltage at terminal A+ of the motor 1 changes slowly, the average voltage across capacitor C2 is close to zero, and the transistor Q1 and SCR 32 are turned off. In this condition, the safety module 30 is inactive, and the speed control circuit 10 and the motor 1 operate normally.

If the IGBT transistor 20 shorts out due to a failure thereof, a sharp voltage step is "seen" at output terminal A+, which voltage step passes through the first filter (C1, R1). If the step exceeds the threshold of zener diode Z1, the voltage step also passes through resistor R2 and zener diode Z1, thereby turning on transistor Q1 and firing (turning on) the SCR 32. When SCR 32 is turned on, it shorts out the output lines A+, A− of the speed control unit 10 and effectively shorts out the armature voltage to the motor 1, thereby de-energizing the motor and turning the motor off very quickly. High current, caused by the shorting of terminals A+, A− by the SCR 32, "blows" the fuse 26 of the speed control circuit 10 in the arrangement shown in FIG. 1.

Alternatively, if the speed control unit 10 does not have a fuse 26 therein, the output A+ thereof is connected to the NF (No Fuse) input of the safety module 30 instead of the A+ input of the safety module 30. In such an alternate arrangement, the fuse of the safety module 30 "blows" when the SCR 32 is turned on to short out the motor. This reliably de-energizes the motor and prevents injury to the user and also prevents damage to the equipment (including the SCR 32).

In summary, if the IGBT transistor 20 fails in a short circuit mode, the safety module 30 of the present invention applies a direct short circuit across the power line to the motor 1 (by means of turning on the SCR 32). This operation is substantially instantaneous. After the SCR 32 shorts out the motor and shorts out the power line to the motor, high current, caused by the approximately 170 volts across terminals A+ and A− , "blows" the armature fuse 26 of the speed control unit 10 or the fuse F1 of the safety module 30, whichever is installed, to maintain the motor 1 always de-energized and to prevent excessive current from flowing through the SCR for a long period of time, thereby also preventing damage to the SCR 32. As a result, the motor 1 is reliably de-energized in a very quick manner and malfunction of the treadmill by operating at high speed is prevented, thereby preventing injury to the user and/or damage to the equipment.

In a preferred embodiment of the present invention, the following components were used:

| | |
|---|---|
| C1 | 0.1 μF-400V-20% |
| C2 | 0.1 μF-400V-20% |
| C3 | 0.01 μF-500V-20% |
| C4 | 0.01 μF-500V-20% |
| Q1 | 300mA-400V    Motorola-MPSA44 |
| R1 | 10K-1W/70° C.-5% |
| R2 | 10K-1W/70° C.-5% |
| R3 | 3.3K-0.25W-5% |
| R4 | 470Ω.25W-5% |

Control of the IGBT transistor 20 (i.e., control of the gate signal thereto) to control the speed of the motor 1 is conventional and is not described herein in detail.

While the invention has been described above with respect to a specific circuit implementation, it should be clear that various modifications and alterations can be made within the spirit and scope of the invention as defined in the appended claims.

I claim:

1. A safety module for a motor speed control circuit, when speed control circuit has a failure mode in which full power is applied to the motor being driven by the speed control circuit, which is coupled to power terminals of a motor, the safety module comprising:

a high pass filter followed by a low-pass filter coupled to the variable voltage power output of said speed control circuit;

a threshold member coupled to an output of said high pass filter for passing a signal only if a change in the signal exceeds a predetermined value; and a semiconductor short-circuiting switching device coupled to said threshold device and coupled to said power terminals of the motor and to said output of said speed control circuit for shorting out said output of said speed control circuit responsive to an abrupt increase in a signal at the output of said speed control circuit which exceeds said predetermined value at the output of said speed control circuit.

\* \* \* \* \*